United States Patent
Tsukamoto et al.

(10) Patent No.: US 11,794,854 B2
(45) Date of Patent: Oct. 24, 2023

(54) BICYCLE ELECTRIC POWER ASSIST DEVICE AND BICYCLE

(71) Applicant: HONDA MOTOR CO., LTD., Tokyo (JP)

(72) Inventors: Kenji Tsukamoto, Saitama (JP); Satoshi Honda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 317 days.

(21) Appl. No.: 17/420,697

(22) PCT Filed: Dec. 26, 2019

(86) PCT No.: PCT/JP2019/051111
§ 371 (c)(1),
(2) Date: Jul. 5, 2021

(87) PCT Pub. No.: WO2020/158280
PCT Pub. Date: Aug. 6, 2020

(65) Prior Publication Data
US 2022/0097798 A1 Mar. 31, 2022

(30) Foreign Application Priority Data

Feb. 1, 2019 (JP) .................. 2019-016938
Mar. 20, 2019 (JP) .................. 2019-052798

(51) Int. Cl.
*B62M 6/50* (2010.01)
*H02K 11/21* (2016.01)
*H02K 7/14* (2006.01)

(52) U.S. Cl.
CPC ............. *B62M 6/50* (2013.01); *H02K 7/14* (2013.01); *H02K 11/21* (2016.01)

(58) Field of Classification Search
CPC ...................................................... B62M 6/50
See application file for complete search history.

(56) References Cited

U.S. PATENT DOCUMENTS

| 6,196,347 B1 | 3/2001 | Chao et al. |
| 2017/0057596 A1 | 3/2017 | Ichida et al. |

FOREIGN PATENT DOCUMENTS

| CN | 102849168 A | 1/2013 |
| EP | 2566748 A1 | 3/2013 |

(Continued)

OTHER PUBLICATIONS

English translation of International Search Report for PCT Application PCT/JP2019/051111 dated Mar. 10, 2020; 6 pp.

(Continued)

*Primary Examiner* — Robert L Deberadinis
(74) *Attorney, Agent, or Firm* — Armstrong Teasdale LLP

(57) ABSTRACT

A bicycle electric power assist device includes: an electric motor connected in a torque transmitting relationship to a crank arm or a crankshaft driven by a pedal force; a battery; a control unit configured to control operation of the electric motor; a rotation angle sensor configured to detect a crank rotation angle position of the crankshaft; and a current sensor configured to detect a motor current, wherein the control unit includes: a pedal force estimation/calculation unit configured to estimate the pedal force of the pedals from a difference between the motor current in a first crank rotation angle position and the motor current in a second crank rotation angle position which is different from the first crank rotation angle position; and a motor drive control unit configured to control a drive current of the electric motor according to the pedal force estimated by the pedal force estimation/calculation unit.

20 Claims, 12 Drawing Sheets

(56) References Cited

FOREIGN PATENT DOCUMENTS

| | | |
|---|---|---|
| EP | 2813419 A1 | 12/2014 |
| EP | 2860096 A1 | 4/2015 |
| EP | 2995544 A1 | 3/2016 |
| EP | 3360769 A1 | 8/2018 |
| JP | H08244671 A | 9/1996 |
| JP | 2001063678 A | 3/2001 |
| JP | 2007091159 A | 4/2007 |
| JP | 2017043322 A | 3/2017 |
| JP | WO2017047333 A1 | 7/2018 |
| KR | 20170022179 A | 3/2017 |
| WO | 2011138166 A1 | 11/2011 |
| WO | 2014181371 A1 | 11/2014 |

OTHER PUBLICATIONS

Partial Supplementary European Search Report for Patent Application EP 19913643.3 dated Feb. 3, 2022; 22 pp.

BICYCLE ELECTRIC POWER ASSIST DEVICE AND BICYCLE

CROSS-REFERENCE TO RELATED APPLICATIONS

This application is a U.S. National Phase Application of PCT/JP2019/051111 filed Dec. 26, 2019, which claims the benefit of Japanese Patent Application No. 2019-052798 filed Mar. 20, 2019 and Japanese Patent Application No. 2019-016938 filed Feb. 1, 2019. The content of these applications is hereby expressly incorporated by reference in their entirety.

TECHNICAL FIELD

The present invention relates to a bicycle electric power assist device and a bicycle, and more particularly to a control system for an electric motor for generating an assist force in the bicycle electric power assist device.

BACKGROUND ART

As an electric power assisted bicycle, there is known an electric power assisted bicycle which measures a strain in the pedal system with a strain gauge, calculates a pedal force from the measured value, and controls operation of an electric motor according to the pedal force (for example, Patent Document 1). Another known electric power assisted bicycle controls operation of an electric motor according to the pedal force detected by a pedal force sensor including a pedal force transmitting sleeve attached to the crankshaft driven by the pedals (for example, Patent Document 2).

PRIOR ART DOCUMENT(S)

Patent Document(s)

Patent Document 1: JP2007-91159A
Patent Document 2: U.S. Pat. No. 6,196,347B1

SUMMARY OF THE INVENTION

Task to be Accomplished by the Invention

In the aforementioned conventional electric power assisted bicycles, the structure for detecting the pedal force is complicated. Particularly, to detect the pedal force in an existing bicycle, it is necessary to modify the bicycle, and this hinders converting an existing bicycle into an electric power assisted bicycle by retrofitting the electric power assist unit.

A task to be accomplished by the present invention is to allow assist control according to the pedal force to be performed in a bicycle electric power assist device without complicating the structure for detecting the pedal force and/or requiring modification of the bicycle.

Means to Accomplish the Task

A bicycle electric power assist device according to one embodiment of the present invention is a bicycle electric power assist device (50), comprising: an electric motor (54) connected in a torque transmitting relationship to crank arms (26) or a crankshaft (24) driven by a pedal force from pedals (30) via the crank arms (26); a battery (102) to be mounted on a bicycle to serve as a power supply for the electric motor (54); a control unit (100) configured to control operation of the electric motor (54); a rotation angle sensor (110) configured to detect a crank rotation angle position of the crankshaft (24); and a current sensor (116) configured to detect a motor current (I) of the electric motor (54), wherein the control unit (100) comprises: a pedal force estimation/calculation unit (120) configured to estimate the pedal force from a difference between the motor current in a first crank rotation angle position (I1) and the motor current in a second crank rotation angle position (I2) which is different from the first crank rotation angle position; and a motor drive control unit (126) configured to control driving of the electric motor (54) according to the pedal force estimated by the pedal force estimation/calculation unit (120).

According to this configuration, assist according to the pedal force is performed without complicating the structure for detecting the pedal force and/or requiring modification of the bicycle.

In the aforementioned bicycle electric power assist device (50), preferably, the motor drive control unit (126) is further configured to calculate an angular velocity (ω) of the crankshaft (24) from the crank rotation angle position and to control the driving of the electric motor (54) according to a difference between the angular velocity (ω1) of the crankshaft (24) in the first crank rotation angle position and the angular velocity (ω2) of the crankshaft (24) in the second crank rotation angle position.

According to this configuration, assist according to the pedaling state intended by the rider is performed.

In the aforementioned bicycle electric power assist device (50), preferably, the motor drive control unit (126) is further configured to calculate an angular acceleration (α) of the crankshaft (24) from the crank rotation angle position and to control the driving of the electric motor (54) according to a difference between the angular acceleration (α1) of the crankshaft (24) in the first crank rotation angle position and the angular acceleration (α2) of the crankshaft (24) in the second crank rotation angle position.

According to this configuration, assist according to the pedaling state intended by the rider is performed.

A bicycle electric power assist device according to another embodiment of the present invention is a bicycle electric power assist device (50), comprising: an electric motor (54) connected in a torque transmitting relationship to crank arms (26) or a crankshaft (24) driven by a pedal force from pedals (30) via the crank arms (26); a battery (102) to be mounted on a bicycle to serve as a power supply for the electric motor (54); a control unit (100) configured to control operation of the electric motor (54); and a rotation angle sensor (110) configured to detect a crank rotation angle position of the crankshaft (24), wherein the control unit (100) comprises: a pedal force estimation/calculation unit (120) configured to calculate an angular velocity (ω) of the crankshaft (24) from a change in the crank rotation angle position and to estimate the pedal force from a difference between the angular velocity (ω1) in a first crank rotation angle position and the angular velocity (ω2) in a second crank rotation angle position which is different from the first crank rotation angle position; and a motor drive control unit (126) configured to control driving of the electric motor (54) according to the pedal force estimated by the pedal force estimation/calculation unit (120).

According to this configuration, assist according to the pedal force is performed without complicating the structure for detecting the pedal force and/or requiring modification of the bicycle.

A bicycle electric power assist device according to another embodiment of the present invention is a bicycle electric power assist device (50), comprising: an electric motor (54) connected in a torque transmitting relationship to crank arms (26) or a crankshaft (24) driven by a pedal force from pedals (30) via the crank arm (26); a battery (102) to be mounted on a bicycle to serve as a power supply for the electric motor (54); a control unit (100) configured to control operation of the electric motor (54); and a rotation angle sensor (110) configured to detect a crank rotation angle position of the crankshaft (24), wherein the control unit comprises: a pedal force estimation/calculation unit (120) configured to calculate an angular acceleration ($\alpha$) of the crankshaft (24) from a change in the crank rotation angle position and to estimate the pedal force from a difference between the angular acceleration ($\alpha 1$) in a first crank rotation angle position and the angular acceleration ($\alpha 2$) in a second crank rotation angle position which is different from the first crank rotation angle position; and a motor drive control unit (126) configured to control driving of the electric motor (54) according to the pedal force estimated by the pedal force estimation/calculation unit (120).

According to this configuration, assist according to the pedal force is performed without complicating the structure for detecting the pedal force and/or requiring modification of the bicycle.

In the aforementioned bicycle electric power assist device (50), preferably, the bicycle electric power assist device comprises a current sensor (116) configured to detect a motor current (I) of the electric motor (54), wherein the motor drive control unit (126) is further configured to control operation of the electric motor (54) according to a difference between the motor current (I1) in the first crank rotation angle position and the motor current (I2) in the second crank rotation angle position.

According to this configuration, assist according to the pedaling state intended by the rider is performed.

In the aforementioned bicycle electric power assist device (50), preferably, wherein the first crank rotation angle position is within an angle range less than or equal to 90 degrees from a highest position of one of the pedals (30), the second crank rotation angle position is within an angle range greater than or equal to 90 degrees and less than or equal to 180 degrees from the highest position of the one of the pedals (30).

According to this configuration, the estimation of the pedal force and the detection of the pedaling state are performed with high accuracy, and the assist according to the pedal force and the pedaling state is performed properly.

In the aforementioned bicycle electric power assist device (50), preferably, the bicycle electric power assist device comprises a crank forward/reverse rotation determination unit (122) configured to determine forward rotation and reverse rotation of the crankshaft (24) from the crank rotation angle position detected by the rotation angle sensor (110), wherein the motor drive control unit (126) performs control to stop the driving of the electric motor (54) when the crank forward/reverse rotation determination unit (122) determines that the crankshaft (24) is rotating in reverse.

According to this configuration, in an operating state in which the crankshaft (24) is rotating in reverse, ineffectual assist is not performed.

In the aforementioned bicycle electric power assist device (50), preferably, the bicycle electric power assist device comprises: a rotation sensor (112) configured to detect rotation of the crankshaft; and a pedal force presence/absence determination unit (124) configured to determine presence or absence of the pedal force applied to the pedals (30) from the rotation of the crankshaft (24) detected by the rotation sensor (112), wherein the motor drive control unit (126) performs control to stop the driving of the electric motor (54) when the pedal force presence/absence determination unit (124) determines that there is no pedal force.

According to this configuration, in a state where there is no pedal force, ineffectual assist is not performed.

In the aforementioned bicycle electric power assist device (50), preferably, the bicycle electric power assist device comprises a gyro sensor (114) configured to detect a tilt of the bicycle (10), wherein the motor drive control unit (126) is further configured to perform control to reduce a rotation output of the electric motor (54) according to the tilt of the bicycle (10) detected by the gyro sensor (114).

According to this configuration, the assist intended by the rider is performed and the safety is improved.

In the aforementioned bicycle electric power assist device (50), preferably, the bicycle electric power assist device comprises a voltage sensor (118) configured to detect a voltage of the battery (102), wherein the motor drive control unit (126) is further configured to perform control to reduce a rotation output of the electric motor (54) according to a drop in the voltage detected by the voltage sensor (118).

According to this configuration, excessive discharge of the battery (102) is prevented.

A bicycle according to one embodiment of the present invention has the bicycle electric power assist device of any one of the aforementioned embodiments mounted thereon.

According to this configuration, assist control according to the pedal force is performed without complicating the structure for detecting the pedal force and/or requiring modification of the bicycle.

Effect of the Invention

In the bicycle electric power assist device according to the present invention, assist control according to the pedal force is performed without complicating the structure for detecting the pedal force and/or requiring modification of the bicycle.

MODES(S) FOR CARRYING OUT THE INVENTION

In the following, one embodiment of a bicycle to which a bicycle electric power assist device according to the present invention is mounted will be described with reference to FIGS. 1 to 5.

Common to First to Fourth Embodiments

Figure 1:
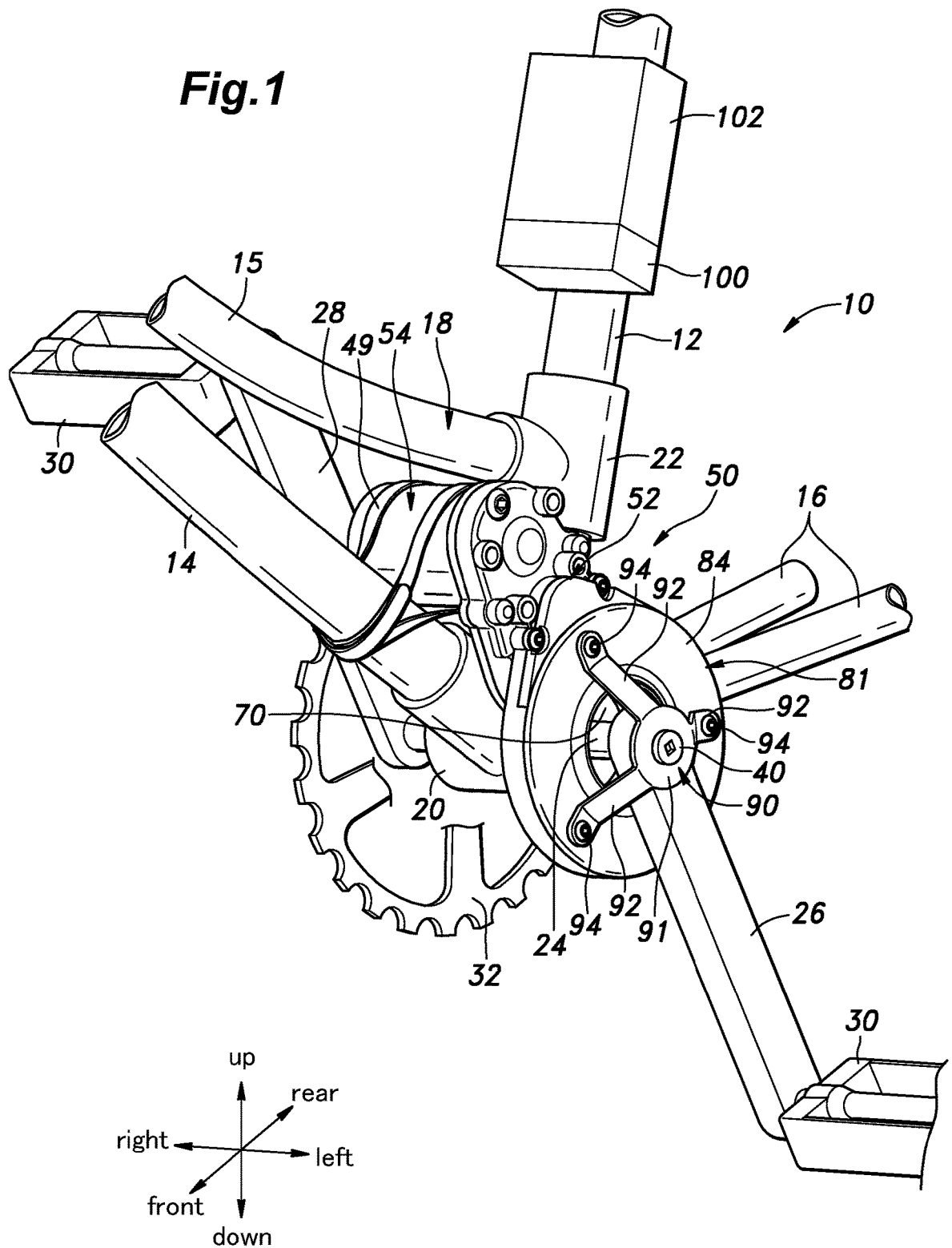
FIG. 1 is a perspective view of a principal part of a bicycle to which a bicycle electric power assist device according to an embodiment of the present invention is mounted.
Figure 2:
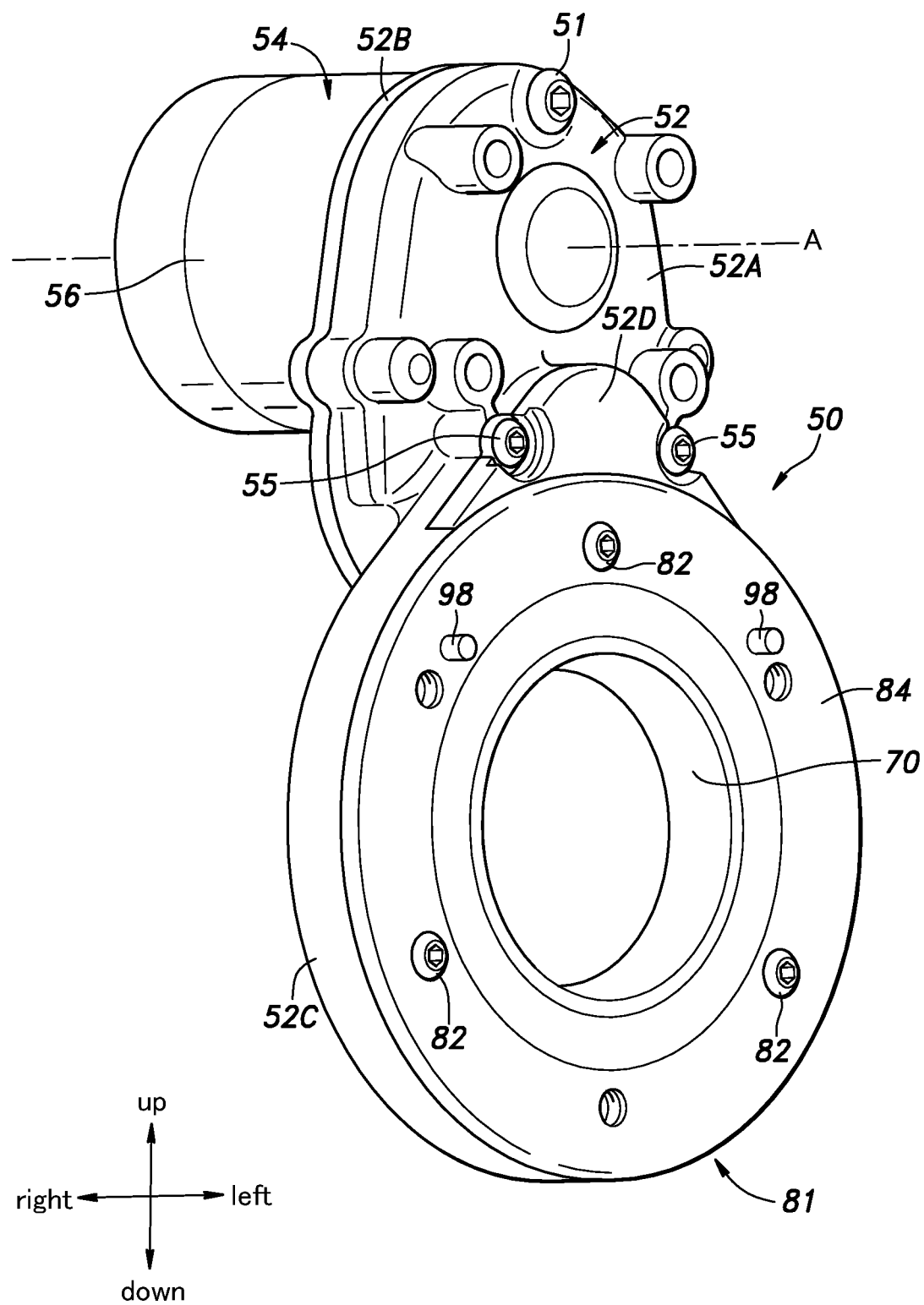
FIG. 2 is a perspective view of the bicycle electric power assist device according to the embodiment of the present invention.

As shown in FIG. 1, the bicycle 10 includes a seat tube 12 that extends substantially in the vertical direction, and is provided with a saddle (not shown in the drawings) attached to the upper end thereof, a down tube 14 and an auxiliary tube 15 that extend in a substantially fore and aft direction, and a frame 18 that includes a pair of left and right chain stays 16. The lower end of the seat tube 12, the rear end of the down tube 14, and the front ends of the chain stays 16 are connected to one another via a tubular bearing housing 20 which serves as a housing for receiving a bearing of a crankshaft as well as a pipe joint. The rear end of the auxiliary tube 15 is connected to a part of the seat tube 12 adjoining the lower end thereof via a pipe joint 22.

The tubular bearing housing 20 rotatably supports a crankshaft (drive shaft) 24 extending substantially horizontally in the lateral direction. The left and right ends of the crankshaft 24 protrude from the tubular bearing housing 20 in the laterally outward direction, and the base ends of a left crank arm 26 and a right crank arm 28 are fixed to the respective shaft ends with a rotational phase difference of 180 degrees. The crankshaft 24 forms the rotational center of the crank arms 26 and 28, and the rotation center axis of the crankshaft 24 and the rotation center axis of the crank arms 26 and 28 are on a common axis.

A pedal 30 is attached to the free end of each crank arm 26, 28. A drive sprocket 32 is positioned between the right crank arm 28 and the tubular bearing housing 20. The drive sprocket 32 is coaxially connected (fixed) to the crankshaft 24.

The crankshaft 24 is rotationally driven by the left and right crank arms 26 and 28. The rotation of the crankshaft 24 is transmitted to the drive sprocket 32 (chain wheel), and thence to the rear wheel (not shown in the drawings) via a chain transmission mechanism (not shown in the drawings). Thereby, the bicycle 10 is propelled forward.

The bicycle 10 is provided with an electric power assist unit (bicycle electric power assist device) 50. In the following description, the up, down, front, back, and left and right directions will be based on the viewpoint of a rider when the electric power assist unit 50 is attached to the frame 18 of the bicycle 10 as shown in FIG. 1.

As shown in FIGS. 1 to 4, the electric power assist unit 50 is provided with a housing 52 having a hollow structure which is formed by an assembly of a first half 52A on the left side, a second half 52B on the right side, and a cover member 52D. The first half 52A and the second half 52B are joined to each other by a plurality of threaded bolts 51. The cover member 52D is joined to the left side of the first half 52A by a plurality of threaded bolts 55.

An electric motor 54 is attached to the housing 52. The electric motor 54 is provided with a cylindrical outer casing 56 having a laterally extending central axis A and fixed to the outer surface of the second half 52B at the base end thereof. The outer casing 56 protrudes rightward from the second half 52B.

Figure 4:
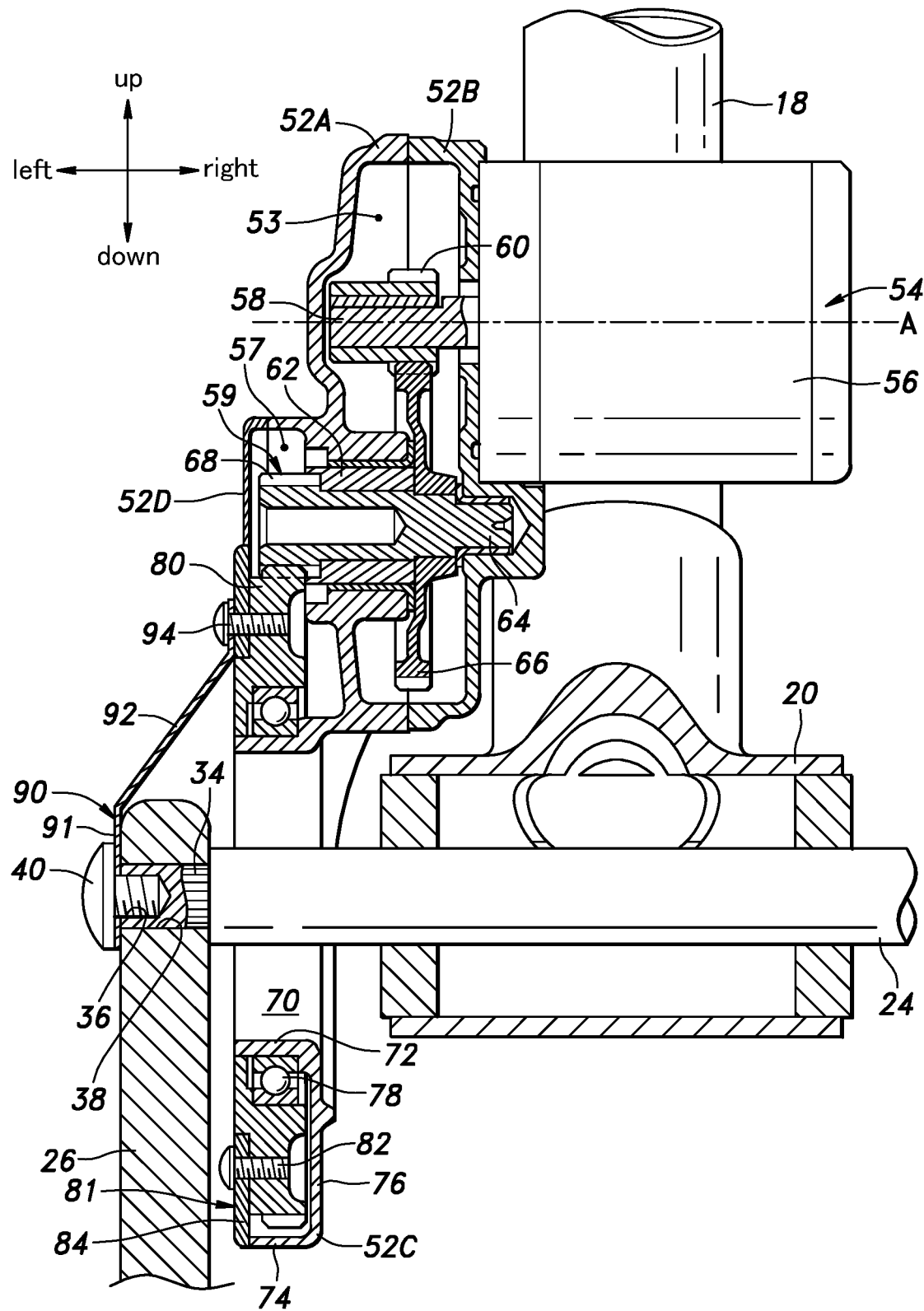
FIG. 4 is a vertical sectional view of the bicycle electric power assist device according to the embodiment of the present invention.

As shown in FIG. 4, the electric motor 54 extends in the lateral direction, and is provided with an output shaft 58 projecting leftward via the second half 52B into the hollow interior of the housing 52. A small drive spur gear 60 is fixed to the output shaft 58. The first half 52A and the second half 52B rotatably support an intermediate shaft 64 extending in the lateral direction via a bush 62 or the like. The intermediate shaft 64 fixedly supports a large-diameter intermediate spur gear 66 that meshes with the drive spur gear 60 on the right side of the bush 62. Thus, the drive spur gear 60 and the intermediate spur gear 66 are accommodated in a first gear chamber 53 defined by the first half 52A and the second half 52B and having a sealed structure. The intermediate shaft 64 is integrally formed with a small-diameter intermediate spur gear 68 formed on the left side of the bush 62.

The first half 52A is integrally formed with an annular part 52C extending downward from a part thereof where the intermediate shaft 64 and the intermediate spur gear 68 are located. The annular part 52C includes a cylindrical portion 72 that defines a central opening 70 opening on both sides in the lateral direction, a substantially cylindrical outer peripheral portion 74 formed radially outward of and concentrically with the cylindrical portion 72, and a right side portion 76 in the form of an annular plate extending between the cylindrical portion 72 and the outer peripheral portion 74. Thus, the annular part 52C has an open side facing leftward. The central opening 70 has an inner diameter sufficiently larger than the outer diameter of the crankshaft 24, and the crankshaft 24 is passed laterally through the central opening in a loose fit.

An annular large-diameter output spur gear 80 is fitted on the outer periphery of the cylindrical portion 72 via a ball bearing 78 so as to be rotatable around a central axis extending in the lateral direction.

The output spur gear 80 meshes with the intermediate spur gear 68 at the upper side of the output spur gear 80. As a result, a transmission gear train 59 is formed between the drive spur gear 60 and the output spur gear 80 by using mutually parallel shafts fitted with the intermediate spur gear 66 and the intermediate spur gear 68. The transmission gear train 59 transmits the rotation of the electric motor 54 to the output spur gear 80 that forms a part of the rotational output member 81 which will be described later.

Due to the transmission gear train 59, the electric motor 54 is offset radially outward relative to the rotational output member 81, and is offset in the axial direction relative to the rotational output member 81.

The rotational output member 81 includes the output spur gear 80 and an annular rotational output plate 84 fixed to the left side surface of the output spur gear 80 in a concentric relationship by using a plurality of threaded bolts 82. The entire left side surface of the rotational output plate 84 is exposed to the left on the left side of the annular part 52C, and is rotatable, jointly with the output spur gear 80, radially outward of the central opening 70 and around the central axis extending laterally with respect to the cylindrical portion 72. The rotational output plate 84 is rotationally driven by the electric motor 54 via the transmission gear train 59.

The rotational output plate 84 has an outer diameter larger than the outer diameter of the output spur gear 80, and conceals the teeth of the output spur gear 80 and the meshing portion between the output spur gear 80 and the intermediate spur gear 68 from the left side (open side) of the annular part 52C. Thus, the rotational output plate 84 serves as a cover member for the output spur gear 80 to protect the teeth of the output spur gear 80.

The rotational output plate 84 defines a second gear chamber 57 having a sealed structure in cooperation with the annular part 52C and the cover member 52D, and the intermediate spur gear 68 and the output spur gear 80 are accommodated in the second gear chamber 57.

Since the output spur gear 80 and the rotational output plate 84 are both in the annular shape concentric with the central opening 70, and are located radially outward of the cylindrical portion 72, the central opening 70 is opened to the both sides without being obstructed by the output spur gear 80 or the rotational output plate 84, and extends laterally with a constant inner diameter.

The electric power assist unit 50 can be installed on a bicycle 10 by a worker in the following way.

First of all, the left pedal 30 remote from the drive sprocket 32 is removed by using a common tool such as a spanner. Then, with the electric power assist unit 50 tilted sideways (so that the electric motor 54 faces upward), the free end of the crank arm 26 on the left side is passed into the central opening 70, and the crank arm 26 is placed in the central opening 70. In this state, the electric power assist unit 50 is moved along the extending direction of the crank arm 26 toward the base end thereof (toward the rotation center side).

Thus, once the crank arm 26 is passed through the rotational output member 81 and the annular part 52C, the electric power assist unit 50 reaches the vicinity of the base end of the crank arm 26. It should be noted that the inner diameter of the central opening 70 is selected in relation with the outer shape of the crank arm 26 so that this installation process can be executed.

If the central opening 70 has an inner diameter that allows the crank arm 26 with the pedal 30 attached thereto to be passed through the central opening 70, the pedal 30 is not required to be removed from the crank arm 26.

Next, the posture of the electric power assist unit 50 is changed so that the electric motor 54 is directed in the horizontal direction (the posture shown in FIG. 1). Thereby, the crankshaft 24 is passed through the central opening 70 in the axial direction in a loose fit. As a result, the rotational output plate 84 and the annular part 52C are positioned between the frame 18 and the crank arm 26 with the crankshaft 24 being passed through the central opening 70 in the lateral direction in a loose fit simply by removing the pedal 30 or even without removing the pedal 30.

Due to the transmission gear train 59, the electric motor 54 is offset radially outward relative to the rotational output member 81, and is offset in the axial direction relative to the rotational output member 81, whereby the electric motor 54 is positioned between the auxiliary tube 15 and the down tube 14 which are located one above the other in front of a lower end part of the seat tube 12 as shown in FIG. 1, and the electric motor 54 is prevented from rotating with respect to the frame 18 by the outer casing 56 coming into contact with the down tube 14 or the auxiliary tube 15. As a result, the rotation of the electric motor 54 with respect to the frame 18 is prevented in a both simple and reliable manner.

The electric power assist unit 50 is fixed to the frame 18 by securing the outer casing 56 of the electric motor 54 to the down tube 14 by using a fastening band 49. The fixing of the electric power assist unit 50 to the frame 18 by using the fastening band 49 may not be highly secure as long as the electric power assist unit 50 does not rattle against the frame 18 when the bicycle 10 is traveling. Thus, the securing of the electric power assist unit 50 to the frame 18 is not essential for the present invention, and may even be omitted.

In this mounted state, the rotational output plate 84 is exposed to the left between the tubular bearing housing 20 and the crank arm 26, and is connected to the rotational center of the crank arm 26 or coaxially to the crankshaft 24 via a connecting member 90 attached to this exposed (left) surface so that the assist force provided by the electric power assist unit 50 is transmitted to the crankshaft 24.

Since the electric motor 54 is located radially outward of the annular part 52C and the rotational output plate 84 owing to the presence of the above-mentioned transmission gear train 59, the electric motor 54 does not hinder the mounting of the annular part 52C and the rotational output plate 84 to the crank arm 26.

Figure 3:
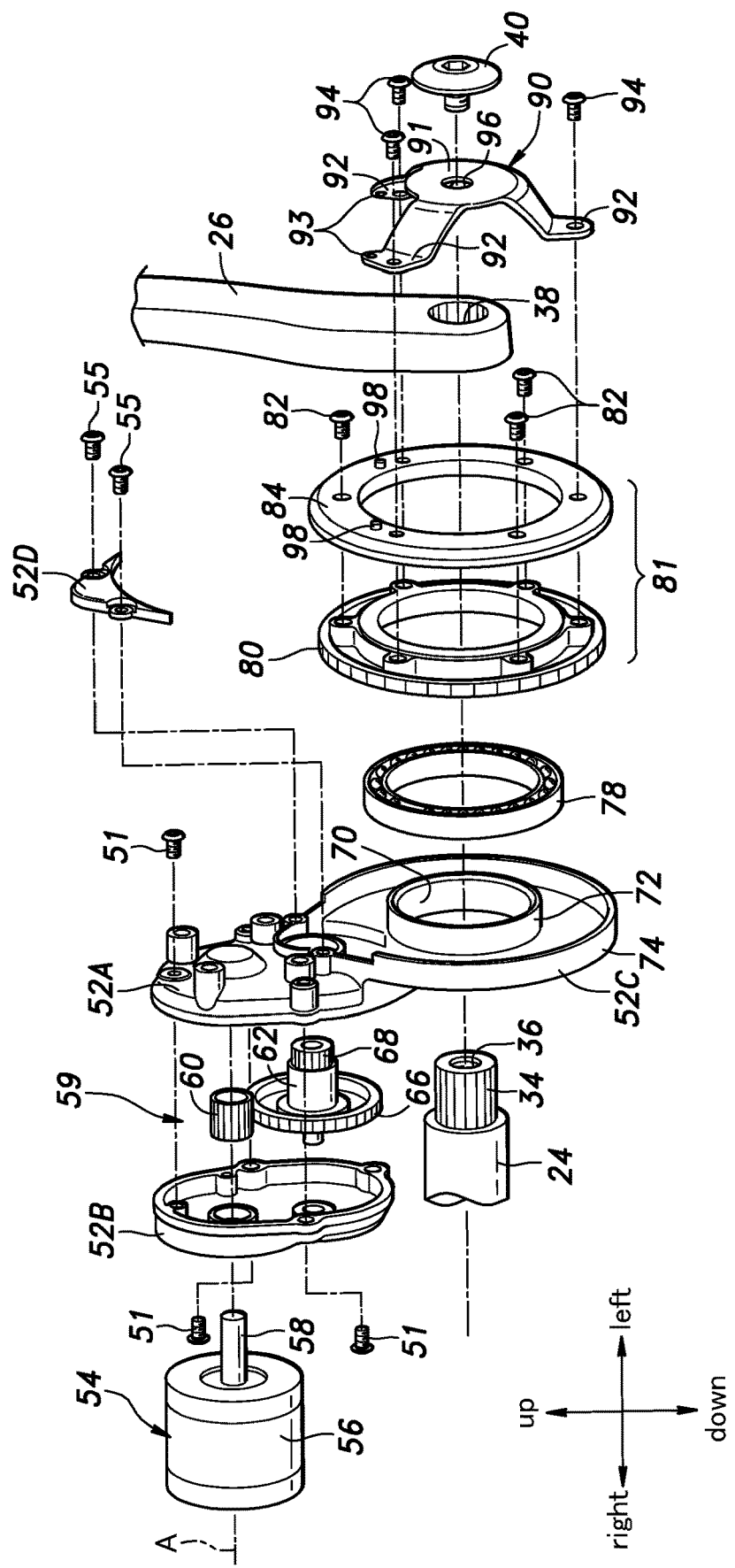
FIG. 3 is an exploded perspective view of the bicycle electric power assist device according to the embodiment of the present invention.

The connecting structure between the crankshaft 24 and the crank arm 26 in the bicycle 10 and the connection structure between the rotational output member 81 and the crankshaft 24 via the connecting member 90 are described in the following with reference to FIGS. 3 and 4.

The crankshaft 24 is provided with a splined part 34 having a smaller diameter than the remaining part thereof at an end part thereof. The axial end of the splined part 34 is centrally provided with a threaded hole 36 for the convenience of removing the crankshaft 24. The base end of the crank arm 26 is provided with a splined hole 38 that is passed laterally through the base end. The splined part 34 is fitted into the splined hole 38 in a spline coupling, and a screw (crankshaft pulling screw) 40 is screwed into the threaded hole 36 from the outside of the crank arm 26, whereby the crankshaft 24 and the crank arm 26 are connected to each other so that a rotational force can be transmitted between the crankshaft 24 and the crank arm 26.

The connecting member 90 is provided with a central portion 91 which is secured to the axial end of the crankshaft 24 by the screw 40 which is threaded into the threaded hole 36 of the crankshaft 24, and a plurality of legs 92 each extending radially outward from the central portion 91 and fixedly secured to the rotational output member 81 by a screw 94 at a free end thereof. Thereby, the rotational output member 81 is connected to the crankshaft 24 in a torque transmitting relationship.

The rotational output plate 84 is provided with a plurality of knock pins 98 which are configured to fit into through holes 93 formed in the free ends of the respective legs 92 (at least two legs) of the connecting member 90 for positioning purpose. Thus, the connecting member 90 is positioned with respect to the rotational output plate 84 so that the connecting member 90 is coaxial with the rotational output plate 84 by fitting the knock pins 98 into the corresponding through holes 93. It should be noted that the inner diameter of the through hole 96 formed in the central portion 91 for the screw 40 may be larger than the outer diameter of the screw 40 so that the central portion 91 may be connected to the crankshaft 24 by the screw 40 after the connecting member 90 is fixedly secured to the rotational output member 81.

As a result, the crankshaft 24 and the rotational output member 81 are concentrically (coaxially) connected to each other by the connecting member 90 and the screw 40 of the existing bicycle 10 in such a manner that the rotation of the rotational output member 81 can be transmitted to the crankshaft 24 without the fear of creating any runout.

As shown in FIG. 1, a control unit 100 for electric power assist and a battery 102 consisting of a secondary battery and serving as a power supply for the electric motor 54 and the control unit 100 are secured to the seat tube 12 by using a fastening band (not shown in the drawings) or the like. The control unit 100 and the battery 102 are provided separately from the housing 52 and the electric motor 54 of the electric power assist unit 50, and they are only required to be electrically connected to the electric motor 54 by an electric cable (not shown in the drawings).

Figure 5:
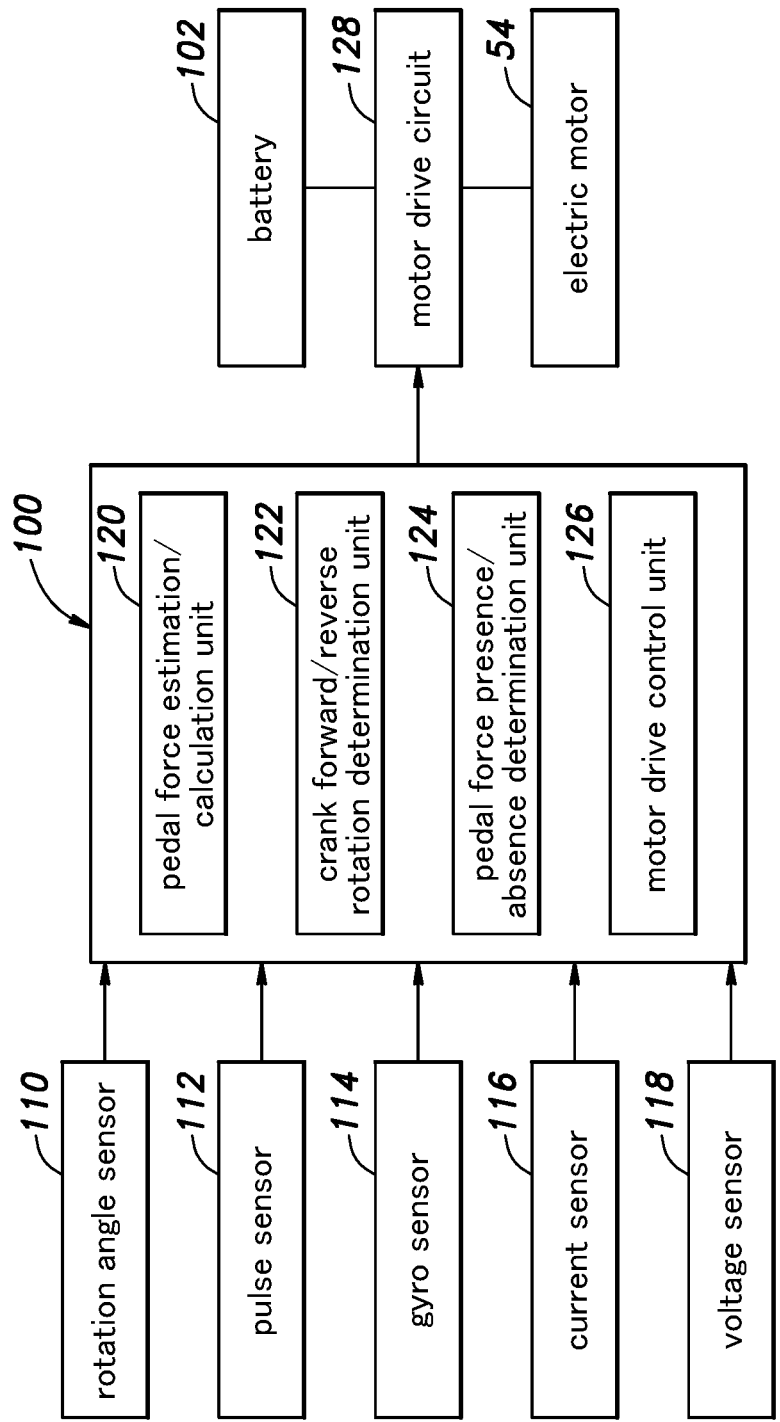
FIG. 5 is a block diagram of a control system of the bicycle electric power assist device according to the embodiment of the present invention.

Next, a control system of the bicycle electric power assist unit 50 will be described with reference to FIG. 5.

The bicycle electric power assist unit 50 includes a rotation angle sensor 110, a pulse sensor 112, a gyro sensor 114, a current sensor 116, and a voltage sensor 118.

The rotation angle sensor 110 is constituted of a Hall sensor or the like built in the electric motor 54 and detects the rotation and angle position of the crankshaft 24 from the accumulation of the motor rotation angle and the reduction ratio of the transmission gear train 59. Note that the rotation angle sensor 110 may be constituted of an absolute type rotary encoder or the like not built in the electric motor 54 and detect the rotation and angle position of the crankshaft 24.

Figure 6:
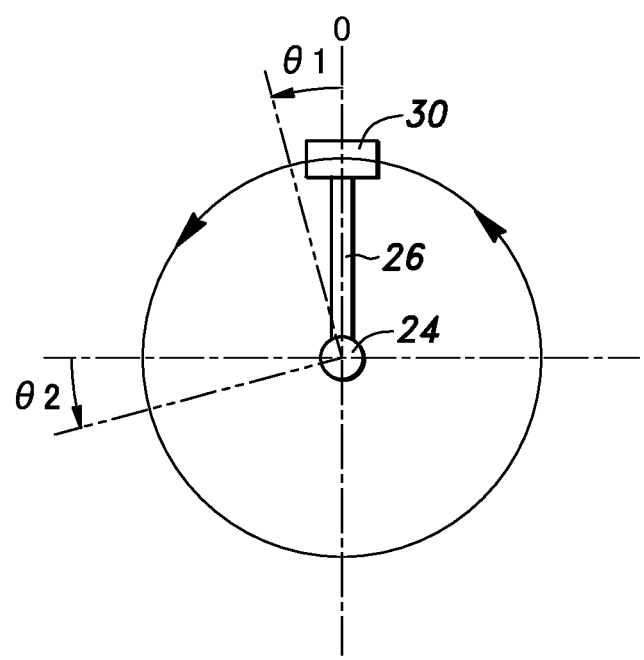
FIG. 6 is an explanatory diagram of a crank rotation angle position of the bicycle to which the bicycle electric power assist device according to the embodiment of the present invention is mounted.

The pulse sensor 112 is provided on the crankshaft 24, the crank arm 26, the pedal 30, the output spur gear 80, or the rotational output plate 84, and as shown in FIG. 6, and is a rotation sensor that detects a reference point of the crank angle of the crankshaft 24 where the pedal 30 of one crank arm 26 is located at the highest position and rotation of the crankshaft 24.

The gyro sensor 114 is provided in the electric power assist unit 50 and detects a tilt of the frame 18 in the lateral direction and in the fore and aft direction.

The voltage sensor 118 detects a voltage of the battery 102.

Figure 7:
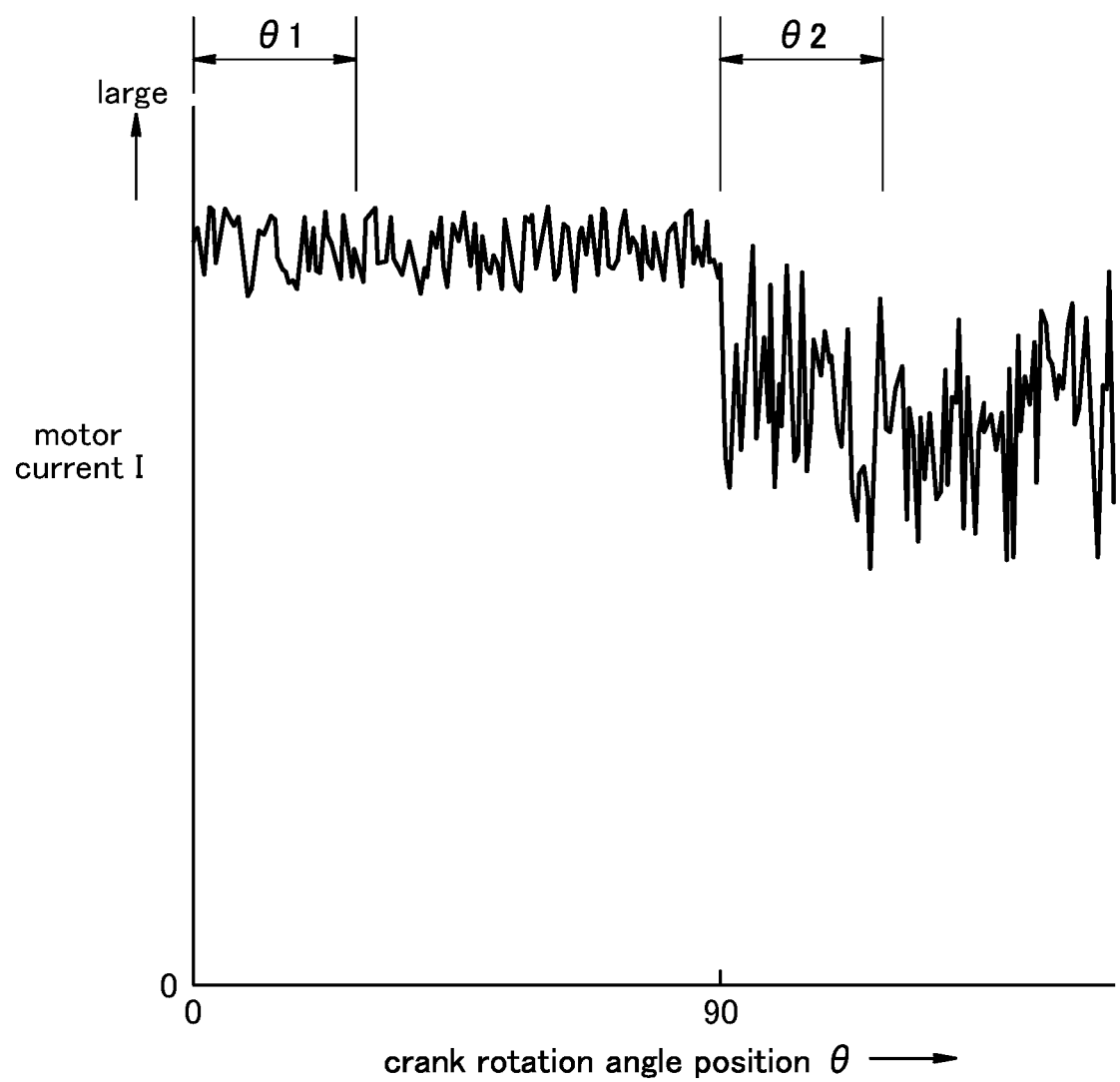
FIG. 7 is a graph showing the relationship between the crank rotation angle position and the motor current.

The current sensor 116 detects a motor current I of the electric motor 54. As shown in FIG. 7, the motor current I changes along with the crank rotation angle position with a period of 360 degrees and has a correlation with the pedal force.

The control unit 100 is of an electronic control type including a microcomputer or the like, and includes a pedal force estimation/calculation unit 120, a crank forward/reverse rotation determination unit 122, a pedal force presence/absence determination unit 124, and a motor drive control unit 126.

First Embodiment

In the first embodiment, the pedal force estimation/calculation unit 120 receives information related to the crank rotation angle position from the rotation angle sensor 110, information related to the reference point of the crank angle of the crankshaft 24 and the rotation of the crankshaft 24 from the pulse sensor 112, and information related to the motor current I from the current sensor 116, and estimates the pedal force of the bicycle 10 from a difference (difference value or ratio) between the motor current I1 in a first crank rotation angle position and the motor current I2 in a second crank rotation angle position which is different from the first crank rotation angle position.

The pedal force estimation/calculation unit 120 estimates that the greater the difference value (I1−I2) between the motor current I1 in the first crank rotation angle position and the motor current in the second crank rotation angle position I2 is, or the greater the ratio (I1/I2) between the motor current I1 and the motor current I2 is, the greater the pedal force is.

The first crank rotation angle position is within an angle range less than or equal to 90 degrees from the highest position of the pedal 30 of the crank arm 26, and the second crank rotation angle position is within an angle range greater than or equal to 90 degrees and less than or equal to 180 degrees from the highest position of the pedal 30 of the crank arm 26.

The motor currents I1 and I2 each may be a motor current I at at least one point within the aforementioned corresponding angle range. Also, the motor current I1 may be an average value or an integrated value of the motor current I in a first angle range $\theta1$ which is about 15 degrees from the highest position of the pedal 30 (see FIG. 6), and the motor current I2 may be an average value or an integrated value of the motor current I in a second angle range $\theta2$ which is about 15 degrees from the position advanced by 90 degrees from the highest position of the pedal 30 (see FIG. 6).

As can be appreciated from the motor current waveform shown in FIG. 7, the average value or the integrated value of the motor current I1 in the first angle range $\theta1$ becomes greater than the average value or the integrated value of the motor current I2 in the second angle range $\theta2$, and the difference value (I1−I2) or the ratio (I1/I2) is substantially proportional to the pedal force.

The motor drive control unit 126 outputs a control command to a motor drive circuit 128 to operate the electric motor 54 with a drive current basically according to the pedal force estimated by the pedal force estimation/calculation unit 120.

Further, the motor drive control unit 126 receives the information related to the crank rotation angle position from the rotation angle sensor 110 and, based on this information, calculates an angular velocity $\omega1$ of the crankshaft 24 in the first crank rotation angle position or the first angle range $\theta1$ and an angular velocity $\omega2$ of the crankshaft 24 in the second crank rotation angle position or the second angle range $\theta2$ and outputs a control command determined according to a difference between the angular velocities $\omega1$ and $\omega2$ to the motor drive circuit 128.

The motor drive circuit 128 quantitatively sets the drive current supplied from the battery 102 to the electric motor 54. Thereby, the electric motor 54 assists the pedaling with the rotation output according to the estimated value of the pedal force and/or the angular velocity of the crankshaft 24. Thus, assist according to the pedal force is performed without complicating the structure for detecting the pedal force and/or requiring modification of the bicycle 10.

The crank forward/reverse rotation determination unit 122 determines forward rotation and reverse rotation of the crankshaft 24 based on the crank rotation angle position detected by the rotation angle sensor 110. When the crank forward/reverse rotation determination unit 122 determines that the crankshaft 24 is rotating in reverse, the motor drive control unit 126 performs control to stop the driving of the electric motor 54. Thereby, when the crankshaft 24 is rotating in reverse, ineffectual assist is not performed.

The pedal force presence/absence determination unit 124 determines presence or absence of the pedal force on the pedal 30 from the rotation of the crankshaft 24 detected by the rotation angle sensor 110. When the pedal force presence/absence determination unit 124 determines that there is no pedal force, the motor drive control unit 126 performs control to stop the driving of the electric motor 54. Thereby, when there is no pedal force, ineffectual assist is not performed.

The motor drive control unit 126 further performs control to increase/decrease the rotation output of the electric motor 54 according to the tilt of the bicycle 10 in the lateral direction and the fore and aft direction detected by the gyro sensor 114. Thereby, the pedaling assist may be weakened when the bicycle 10 is tilted in the lateral direction during turn or the like or the pedaling assist may be increased when the bicycle 10 is tilted in the fore and aft direction on an uphill road or the like, so that the assist intended by the rider is performed and the safety is improved.

The motor drive control unit 126 further performs control to reduce the rotation output of the electric motor 54 according to reduction in the battery voltage detected by the voltage sensor 118. Thereby, excessive discharge of the battery 102 is prevented and the life time of the battery 102 is extended. Also, the power consumption of the battery 102 is suppressed so that the assist continuation distance (time) per single charge of the battery 102 is extended.

Figure 8:
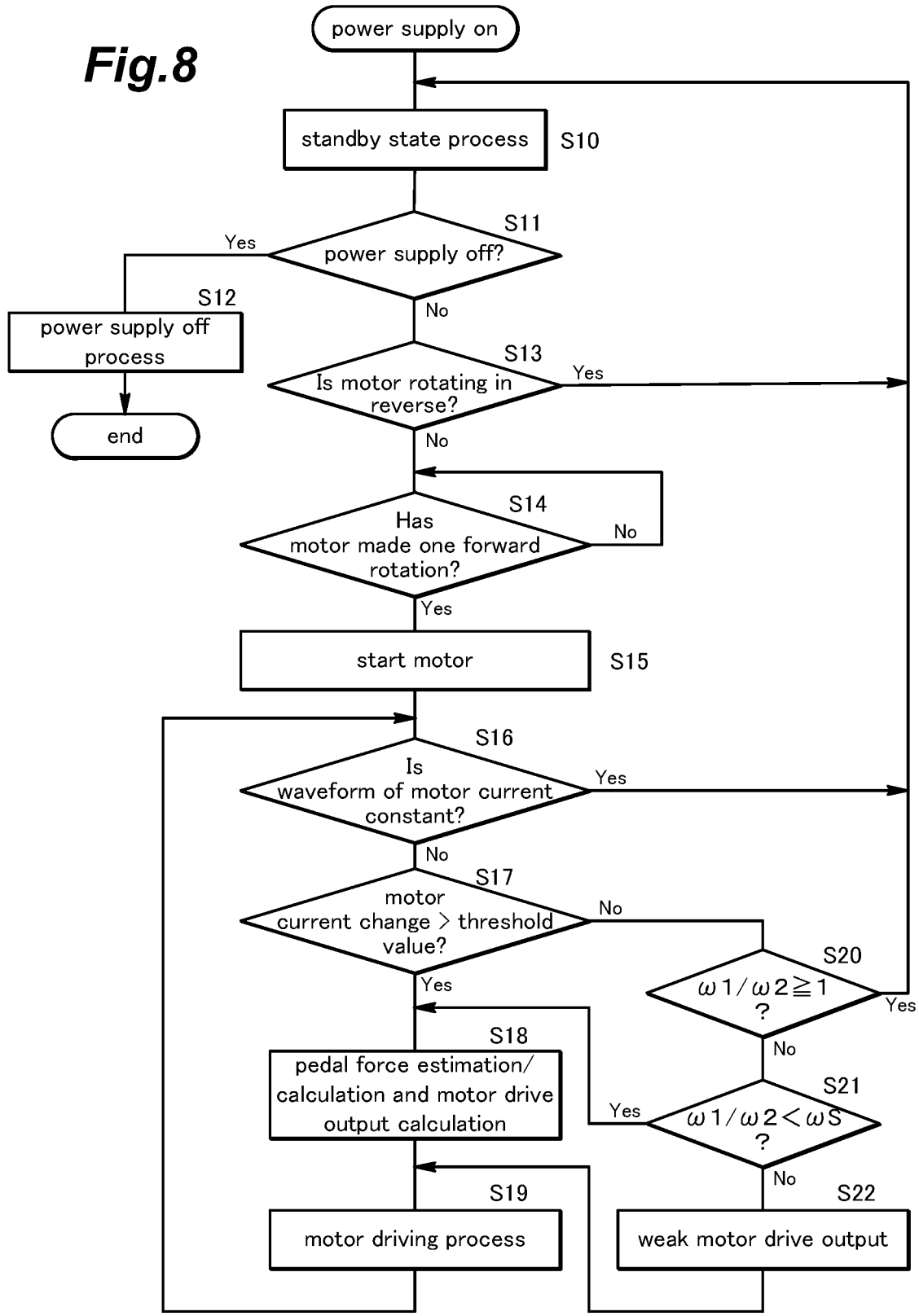
FIG. 8 is a flowchart of assist control of the bicycle electric power assist device according to the embodiment (first embodiment) of the present invention.

Next, a control routine of the control unit 100 according to the first embodiment will be described with reference to the flowchart shown in FIG. 8.

This control routine is started upon turning on of the power supply of the electric power assist unit 50, and first of all, a standby state process is performed (step S10). The standby state process includes supplying electricity to each sensor 110, 112, 141, 116, 118 to make them active and putting the electric motor 54 into a stopped state.

Then, it is determined whether the power supply of the electric power assist unit 50 has been turned off (step S11). If the power supply has been turned off, a power supply off process is performed (step S12). The power supply off process includes stopping the supply of electricity to each sensor 110, 112, 114, 116, 118.

If the power supply has not been turned off, it is determined whether the electric motor 54 is rotating in reverse (step S13). If the electric motor 54 is rotating in reverse, the flow returns to the standby state process (step S10).

If the electric motor 54 is not rotating in reverse, the electric motor 54 is started (step S15) after it is confirmed that the electric motor 54 has made one rotation (step S14).

Subsequently, it is determined whether the waveform of the motor current I in a period of one rotation of the crankshaft 24 is constant (step S16). If the waveform of the motor current I is constant, the pedal force is estimated to be substantially zero and it is determined that the bicycle is traveling under inertia and requires no assist, and the flow returns to the standby state process (step S10).

If the waveform of the motor current I is not constant, it is determined whether or not a change (difference) in the motor current I is greater than or equal to a prescribed threshold value (step S17). This determination is a determination as to whether or not a change (difference value) between the average value or the integrated value of the motor current I in the first angle range $\theta 1$ and the average value or the integrated value of the motor current I in the second angle range $\theta 2$ is greater than or equal to the prescribed threshold value.

If the change in the motor current I is greater than or equal to the prescribed threshold value, calculation is performed to estimate the pedal force according to the difference value, with an assumption that the pedal force is substantially proportional to the difference value between the average value or the integrated value of the motor current I in the first angle range $\theta 1$ and the average value or the integrated value of the motor current I in the second angle range $\theta 2$, and a motor drive output according to the estimated pedal force is calculated (step S18).

Subsequently, a motor driving process according to the calculated motor drive output is performed (step S19). The motor driving process includes supplying a drive current according to the calculated motor drive output to the electric motor 54. Thereby, assist of the pedaling according to the pedal force is performed.

If the change in the motor current I is less than the prescribed threshold value, the angular velocity $\omega 1$ of the crankshaft 24 in the first angle range $\theta 1$ and the angular velocity $\omega 2$ of the crankshaft 24 in the second angle range $\theta 2$ are calculated, and it is determined whether or not $(\omega 1/\omega 2)$ is greater than or equal to 1 (step S20). If $(\omega 1/\omega 2)$ is greater than or equal to 1, the flow returns to the standby state process (step S10). If $(\omega 1/\omega 2)$ is less than 1, then, it is determined whether $(\omega 1/\omega 2)$ is less than a prescribed threshold value $\omega S$ (step S21).

If $(\omega 1/\omega 2)$ is less than or equal to the prescribed threshold value $\omega S$, it is estimated that the smaller $(\omega 1/\omega 2)$ is, the greater the pedal force is, and a motor drive output according to $(\omega 1/\omega 2)$ is calculated (step S18) so that the motor driving process according to the calculated motor drive output is performed (step S19). Thereby, assist according to the pedaling state based on $(\omega 1/\omega 2)$ is performed.

If $(\omega 1/\omega 2)$ is not less than or equal to the prescribed threshold value $\omega S$, the motor drive output is set to "weak" with a predefined low output (step S22), and the motor driving process according to the "weak" motor drive output is performed (step S19).

Thus, assist according to the pedal force is performed without complicating the structure for detecting the pedal force and/or requiring modification of the bicycle 10, and assist according to the pedaling state intended by the rider is performed.

Second Embodiment

In the second embodiment, in addition to outputting the control command according to the pedal force estimated by the pedal force estimation/calculation unit 120, the motor drive control unit 126 receives the information related to the crank rotation angle position from the rotation angle sensor 110 and, based on this information, calculates an angular acceleration $\alpha 1$ of the crankshaft 24 in the first crank rotation angle position or the first angle range $\theta 1$ and an angular acceleration $\alpha 2$ of the crankshaft 24 in the second crank rotation angle position or the second angle range $\theta 2$ from a temporal change in the crank rotation angle position, and outputs a control command determined according to the difference between the angular accelerations $\alpha 1$ and $\alpha 2$ to the motor drive circuit 128.

Figure 9:
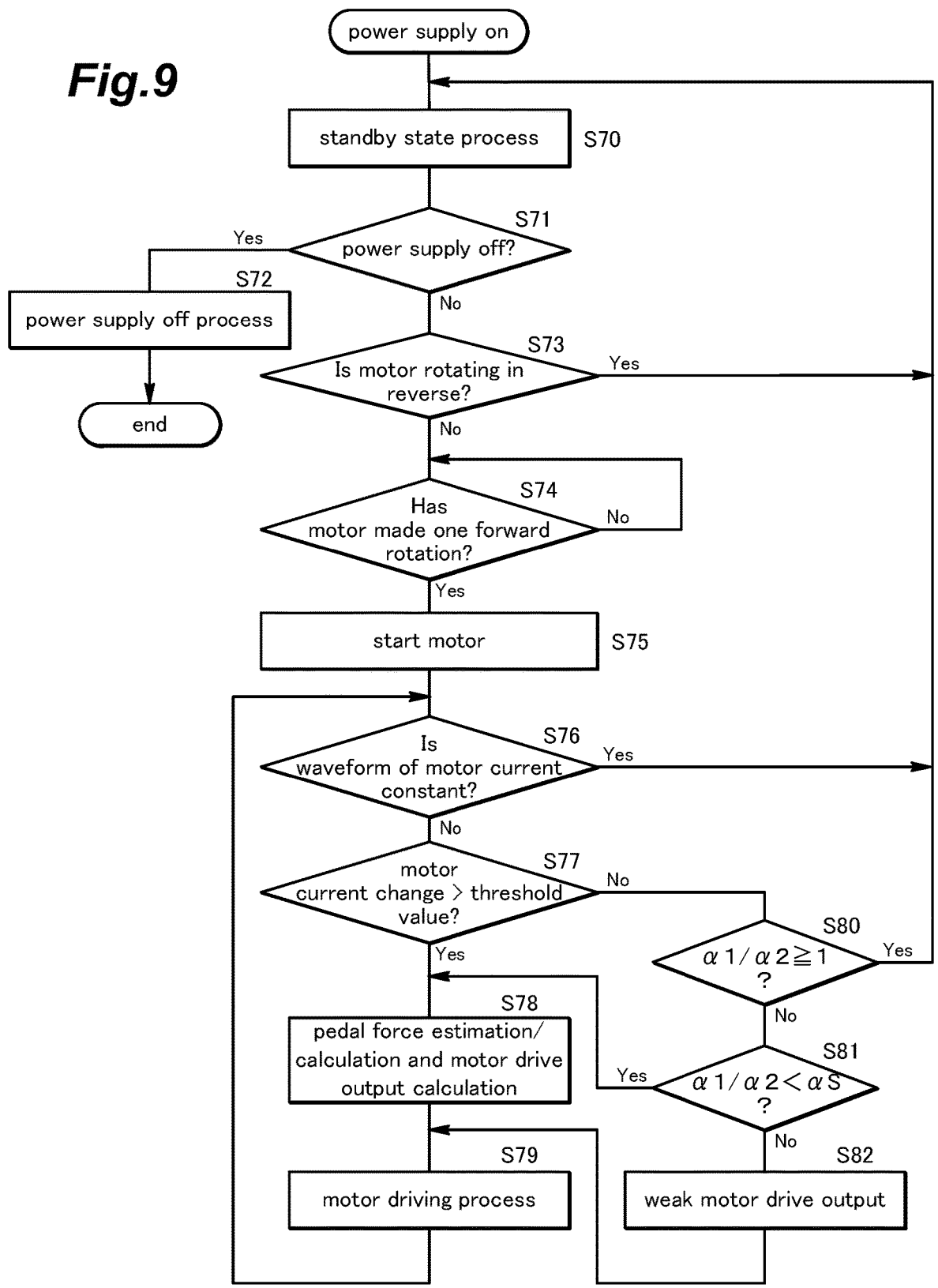
FIG. 9 is a flowchart of assist control of the bicycle electric power assist device according to another embodiment (second embodiment) of the present invention.

Next, a control routine of the control unit 100 according to the second embodiment will be described with reference to the flowchart shown in FIG. 9.

This control routine is started upon turning on of the power supply of the electric power assist unit 50, and first of all, a standby state process is performed (step S70). The standby state process includes supplying electricity to each sensor 110, 112, 141, 116, 118 to make them active and putting the electric motor 54 into a stopped state.

Then, it is determined whether the power supply of the electric power assist unit 50 has been turned off (step S71). If the power supply has been turned off, a power supply off process is performed (step S72). The power supply off process includes stopping the supply of electricity to each sensor 110, 112, 114, 116, 118.

If the power supply has not been turned off, it is determined whether the electric motor 54 is rotating in reverse (step S73). If the electric motor 54 is rotating in reverse, the flow returns to the standby state process (step S70).

If the electric motor 54 is not rotating in reverse, the electric motor 54 is started (step S75) after it is confirmed that the electric motor 54 has made one rotation (step S74).

Subsequently, it is determined whether the waveform of the motor current I in a period of one rotation of the crankshaft 24 is constant (step S76). If the waveform of the motor current I is constant, the pedal force is estimated to be substantially zero and it is determined that the bicycle is traveling under inertia and requires no assist, and the flow returns to the standby state process (step S70).

If the waveform of the motor current I is not constant, it is determined whether or not a change (difference) in the motor current I is greater than or equal to a prescribed threshold value (step S77). This determination is a determination as to whether or not a change (difference value) between the average value or the integrated value of the motor current I in the first angle range $\theta 1$ and the average value or the integrated value of the motor current I in the second angle range $\theta 2$ is greater than or equal to the prescribed threshold value.

If the change in the motor current I is greater than or equal to the prescribed threshold value, calculation is performed to estimate the pedal force according to the difference value, with an assumption that the pedal force is substantially proportional to the difference value between the average value or the integrated value of the motor current I in the first angle range $\theta 1$ and the average value or the integrated value of the motor current I in the second angle range $\theta 2$, and a motor drive output according to the estimated pedal force is calculated (step S78).

Subsequently, a motor driving process according to the calculated motor drive output is performed (step S79). The motor driving process includes supplying a drive current according to the calculated motor drive output to the electric motor 54. Thereby, assist of the pedaling according to the pedal force is performed.

If the change in the motor current I is less than the prescribed threshold value, the angular acceleration $\alpha 1$ of the crankshaft 24 in the first angle range $\theta 1$ and the angular acceleration $\alpha 2$ of the crankshaft 24 in the second angle range $\theta 2$ are calculated, and it is determined whether or not $(\alpha 1/\alpha 2)$ is greater than or equal to 1 (step S80). If $(\alpha 1/\alpha 2)$ is greater than or equal to 1, the flow returns to the standby state process (step S70). If $(\alpha 1/\alpha 2)$ is less than 1, then, it is determined whether $(\alpha 1/\alpha 2)$ is less than a prescribed threshold value $\alpha S$ (step S81).

If $(\alpha 1/\alpha 2)$ is less than or equal to the prescribed threshold value $\alpha S$, it is estimated that the smaller $(\alpha 1/\alpha 2)$ is, the greater the pedal force is, and a motor drive output according to $(\alpha 1/\alpha 2)$ is calculated (step S78) so that the motor driving process according to the calculated motor drive output is performed (step S79). Thereby, assist according to the pedaling state based on $(\alpha 1/\alpha 2)$ is performed.

If $(\alpha 1/\alpha 2)$ is not less than or equal to the prescribed threshold value $\omega S$, the motor drive output is set to "weak" with a predefined low output (step S82), and the motor driving process according to the "weak" motor drive output is performed (step S19).

Thus, assist according to the pedal force is performed without complicating the structure for detecting the pedal force and/or requiring modification of the bicycle 10, and assist according to the pedaling state intended by the rider is performed.

Third Embodiment

In the third embodiment, the pedal force estimation/calculation unit 120 receives the information related to the crank rotation angle position from the rotation angle sensor 110 and the information related to the reference point of the crank angle of the crankshaft 24 and the rotation of the crankshaft 24 from the pulse sensor 112, calculates an angular velocity $\omega$ of the crankshaft 24 from a temporal change in the crank rotation angle position, and estimates the pedal force of the bicycle 10 from a difference (difference value or ratio) between an angular velocity $\omega 1$ of the crankshaft 24 in a first crank rotation angle position and an angular velocity $\omega 2$ of the crankshaft 24 in a second crank rotation angle position which is different from the first crank rotation angle position.

The pedal force estimation/calculation unit 120 estimates that the smaller the difference value $(\omega 2 - \omega 1)$ between the angular velocity $\omega 2$ in the second crank rotation angle position and the angular velocity $\omega 1$ in the first crank rotation angle position is, or the smaller the ratio $(\omega 2/\omega 1)$ between the angular velocity $\omega 2$ and the angular velocity $\omega 1$ is, the greater the pedal force is.

In the third embodiment also, the first crank rotation angle position is within an angle range less than or equal to 90 degrees from the highest position of the pedal 30 of the crank arm 26, and the second crank rotation angle position is within an angle range greater than or equal to 90 degrees and less than or equal to 180 degrees from the highest position of the pedal 30 of the crank arm 26.

The angular velocities $\omega 1$ and $\omega 2$ each may be an angular velocity $\omega$ at at least one point within the aforementioned corresponding angle range. Also, the angular velocity $\omega 1$ may be an average value or an integrated value of the angular velocity $\omega$ in the first angle range $\theta 1$ (see FIG. 6) which is about 15 degrees from the highest position of the pedal 30, and the angular velocity $\omega 2$ may be an average value or an integrated value of the angular velocity $\omega$ in the second angle range $\theta 2$ (see FIG. 6) which is about 15 degrees from the position advanced by 90 degrees from the highest position of the pedal 30.

Figure 10:
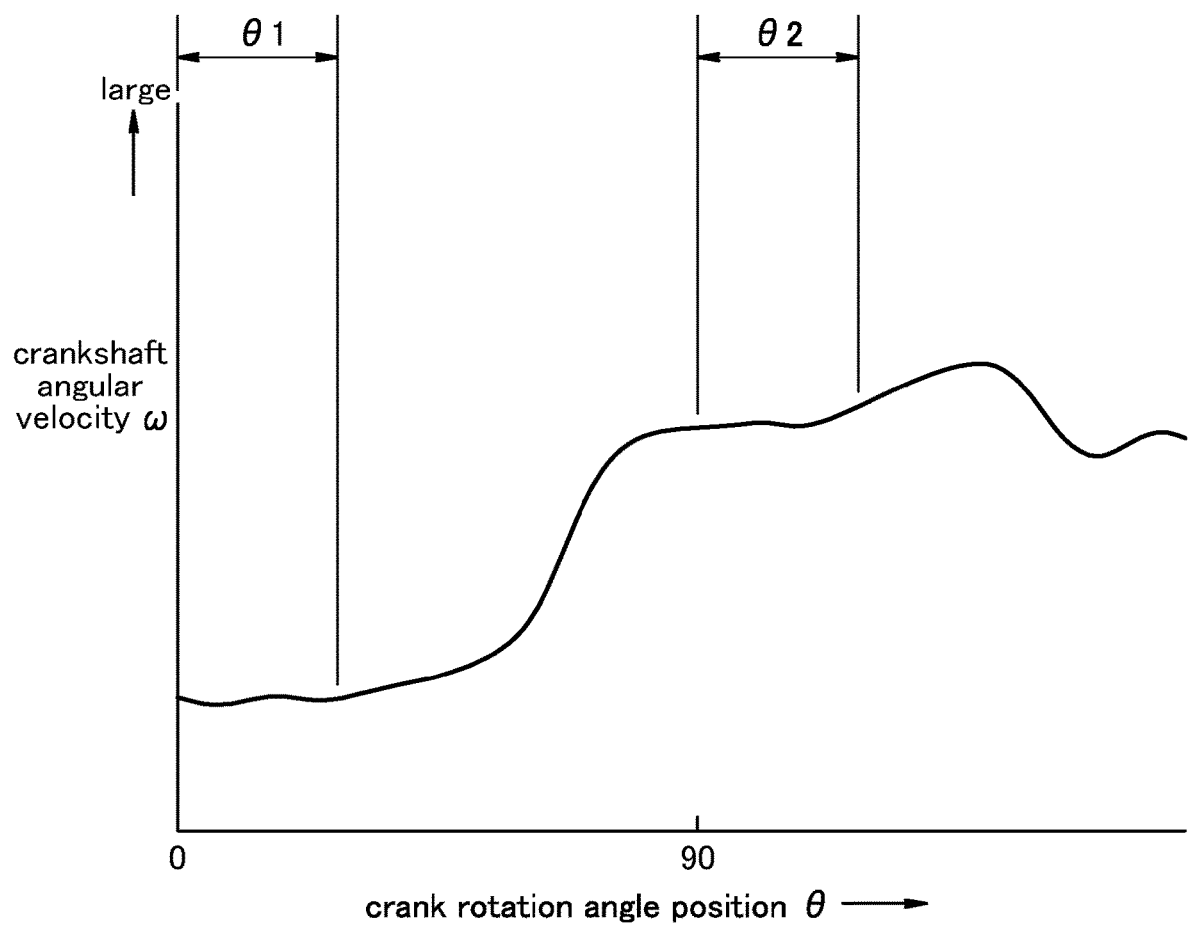
FIG. 10 is a graph showing the relationship between the crank rotation angle position and the angular velocity of the crankshaft.

As can be appreciated from the angular velocity waveform shown in FIG. 10, the average value or the integrated value of the angular velocity $\omega 2$ in the second angle range $\theta 2$ becomes greater than the average value or the integrated value of the angular velocity $\omega 1$ in the first angle range $\theta 1$, and the difference value $(\omega 2 - \omega 1)$ or the ratio $(\omega 2/\omega 1)$ is substantially proportional to the pedal force.

The motor drive control unit 126 outputs a control command to the motor drive circuit 128 to operate the electric motor 54 with a drive current basically according to the pedal force estimated by the pedal force estimation/calculation unit 120.

Further, the motor drive control unit 126 receives the information related to the motor current I from the current sensor 116 and, based on this information, outputs a control command determined according to a difference between the motor current I1 in the first crank rotation angle position or the first angle range θ1 and the motor current I2 in the second crank rotation angle position or the second angle range θ2 to the motor drive circuit 128.

The motor drive circuit 128 quantitatively sets the drive current supplied from the battery 102 to the electric motor 54. Thereby, the electric motor 54 assists the pedaling with the rotation output according to the estimated value of the pedal force and/or the motor current. Thus, assist according to the pedal force is performed without complicating the structure for detecting the pedal force and/or requiring modification of the bicycle 10.

Figure 11:
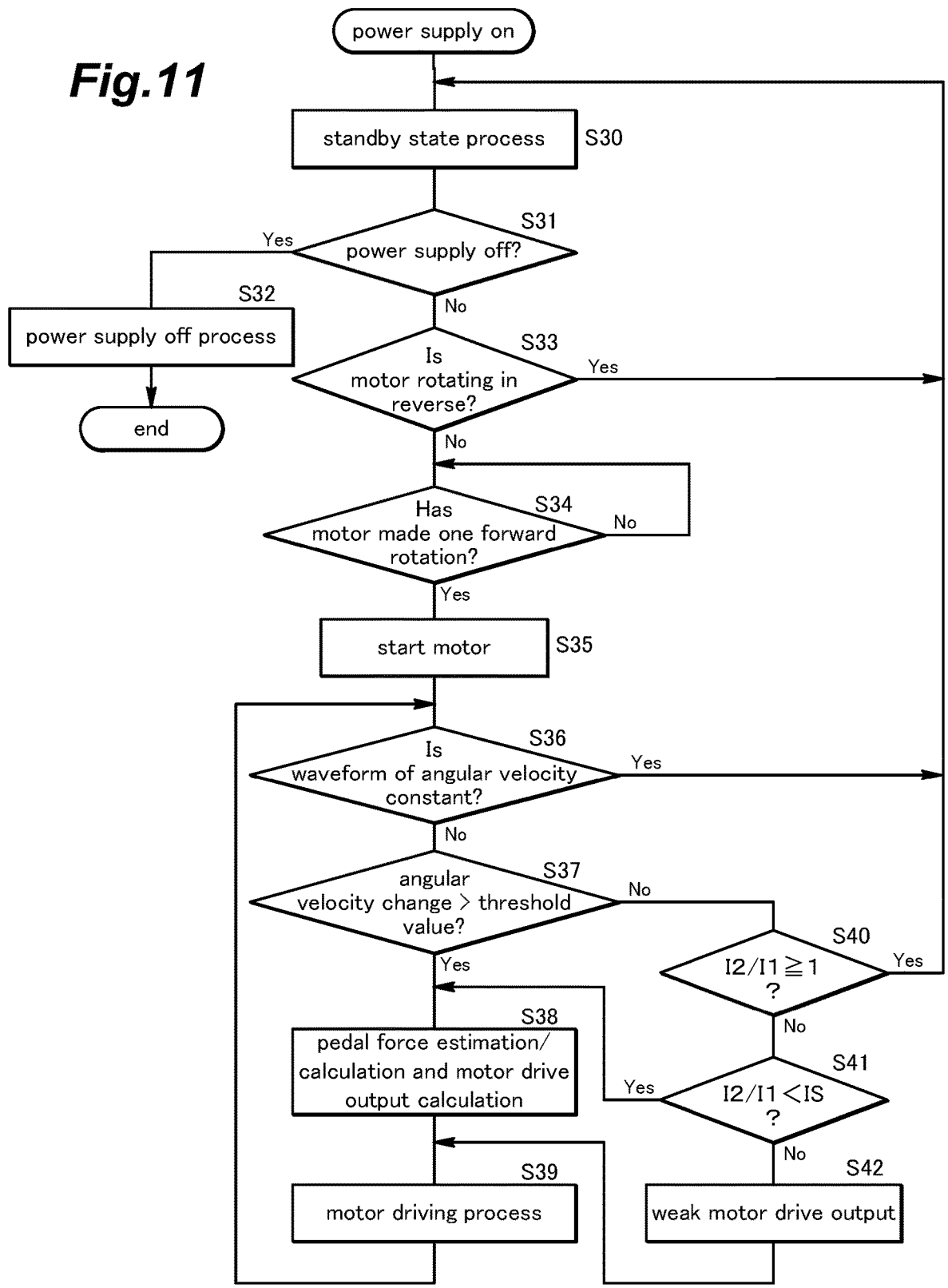
FIG. 11 is a flowchart of assist control of the bicycle electric power assist device according to another embodiment (third embodiment) of the present invention.

Next, a control routine of the control unit 100 according to the third embodiment will be described with reference to the flowchart shown in FIG. 11.

This control routine is started upon turning on of the power supply of the electric power assist unit 50, and first of all, a standby state process is performed (step S30). The standby state process includes supplying electricity to each sensor 110, 112, 141, 116, 118 to make them active and putting the electric motor 54 into a stopped state.

Then, it is determined whether the power supply of the electric power assist unit 50 has been turned off (step S31). If the power supply has been turned off, a power supply off process is performed (step S32). The power supply off process includes stopping the supply of electricity to each sensor 110, 112, 114, 116, 118.

If the power supply has not been turned off, it is determined whether the electric motor 54 is rotating in reverse (step S33). If the electric motor 54 is rotating in reverse, the flow returns to the standby state process (step S10).

If the electric motor 54 is not rotating in reverse, the electric motor 54 is started (step S35) after it is confirmed that the electric motor 54 has made one rotation (step S34).

Subsequently, it is determined whether the waveform of the angular velocity ω of the crankshaft 24 in a period of one rotation of the crankshaft 24 is constant (step S36). If the waveform of the angular velocity ω is constant, the pedal force is estimated to be substantially zero and it is determined that the bicycle is traveling under inertia and requires no assist, and the flow returns to the standby state process (step S30).

If the waveform of the angular velocity ω is not constant, it is determined whether or not a change (difference) in the angular velocity ω is greater than or equal to a prescribed threshold value (step S37). This determination is a determination as to whether or not a change (difference value) between the average value or the integrated value of the angular velocity ω in the second angle range θ2 and the average value or the integrated value of the angular velocity ω in the first angle range θ1 is greater than or equal to the prescribed threshold value.

If the change in the angular velocity ω is greater than or equal to the prescribed threshold value, calculation is performed to estimate the pedal force according to the difference value, with an assumption that the pedal force is substantially proportional to the difference value between the average value or the integrated value of the angular velocity ω in the second angle range θ2 and the average value or the integrated value of the angular velocity ω in the first angle range θ1, and a motor drive output according to the estimated pedal force is calculated (step S38).

Subsequently, a motor driving process according to the calculated motor drive output is performed (step S39). The motor driving process includes supplying a drive current according to the calculated motor drive output to the electric motor 54. Thereby, assist of the pedaling according to the pedal force is performed.

If the change in the angular velocity ω is less than the prescribed threshold value, the motor current I1 in the first angle range θ1 and the motor current I2 in the second angle range θ2 are calculated, and it is determined whether or not (I2/I1) is greater than or equal to 1 (step S40). If (I2/I1) is greater than or equal to 1, the flow returns to the standby state process (step S30). If (I2/I1) is less than 1, then, it is determined whether or not (I2/I1) is less than or equal to a prescribed threshold value IS (step S41).

If (I2/I1) is less than or equal to the prescribed threshold value IS, a motor drive output according to (I2/I1) is calculated (step S38) so that the motor driving process according to the calculated motor drive output is performed (step S39). Thereby, assist according to the pedaling state based on (I2/I1) is performed.

If (I2/I1) is not less than or equal to the prescribed threshold value IS, the motor drive output is set to "weak" with a predefined low output (step S42), and the motor driving process according to the "weak" motor drive output is performed (step S39).

Thus, assist according to the pedal force is performed without complicating the structure for detecting the pedal force and/or requiring modification of the bicycle 10, and assist according to the pedaling state intended by the rider is performed.

Fourth Embodiment

In the fourth embodiment, the pedal force estimation/calculation unit 120 receives the information related to the crank rotation angle position from the rotation angle sensor 110 and the information related to the reference point of the crank angle of the crankshaft 24 and the rotation of the crankshaft 24 from the pulse sensor 112, calculates an angular acceleration α of the crankshaft 24 from a temporal change in the crank rotation angle position, and estimates the pedal force of the bicycle 10 from a difference (difference value or ratio) between an angular acceleration α1 of the crankshaft 24 in a first crank rotation angle position and an angular acceleration α2 of the crankshaft 24 in a second crank rotation angle position which is different from the first crank rotation angle position.

The pedal force estimation/calculation unit 120 estimates that the greater the difference value (α2−α1) between the angular acceleration α2 in the second crank rotation angle position and the angular acceleration α1 in the first crank rotation angle position is, or the greater the ratio (α2/α1) between the angular acceleration α2 and the angular acceleration α1 is, the greater the pedal force is.

In the fourth embodiment also, the first crank rotation angle position is within an angle range less than or equal to 90 degrees from the highest position of the pedal 30 of the crank arm 26, and the second crank rotation angle position is within an angle range greater than or equal to 90 degrees and less than or equal to 180 degrees from the highest position of the pedal 30 of the crank arm 26.

The angular accelerations α1 and α2 each may be an angular acceleration α at at least one point within the aforementioned corresponding angle range. Also, the angular acceleration α1 may be an average value or an integrated value of the angular acceleration α in the first angle range θ1 (see FIG. 6) which is about 15 degrees from the highest position of the pedal 30, and the angular acceleration α2 may be an average value or an integrated value of the angular acceleration α in the second angle range θ2 (see FIG. 6) which is about 15 degrees from the position advanced by 90 degrees from the highest position of the pedal 30.

The average value or the integrated value of the angular acceleration α2 in the second angle range θ2 becomes greater than the average value or the integrated value of the angular acceleration α1 in the first angle range θ1, and the difference value (α2−α1) or the ratio (α2/α1) is substantially proportional to the pedal force.

The motor drive control unit 126 outputs a control command (drive current command) to the motor drive circuit 128 to operate the electric motor 54 with a drive current basically according to the pedal force estimated by the pedal force estimation/calculation unit 120.

Further, the motor drive control unit 126 receives the information related to the motor current I from the current sensor 116 and, based on this information, outputs a control command determined according to a difference between the motor current I1 in the first crank rotation angle position or the first angle range θ1 and the motor current I2 in the second crank rotation angle position or the second angle range θ2 to the motor drive circuit 128.

The motor drive circuit 128 quantitatively sets the drive current supplied from the battery 102 to the electric motor 54. Thereby, the electric motor 54 assists the pedaling with the rotation output according to the estimated value of the pedal force and/or the motor current. Thus, assist according to the pedal force is performed without complicating the structure for detecting the pedal force and/or requiring modification of the bicycle 10.

Figure 12:
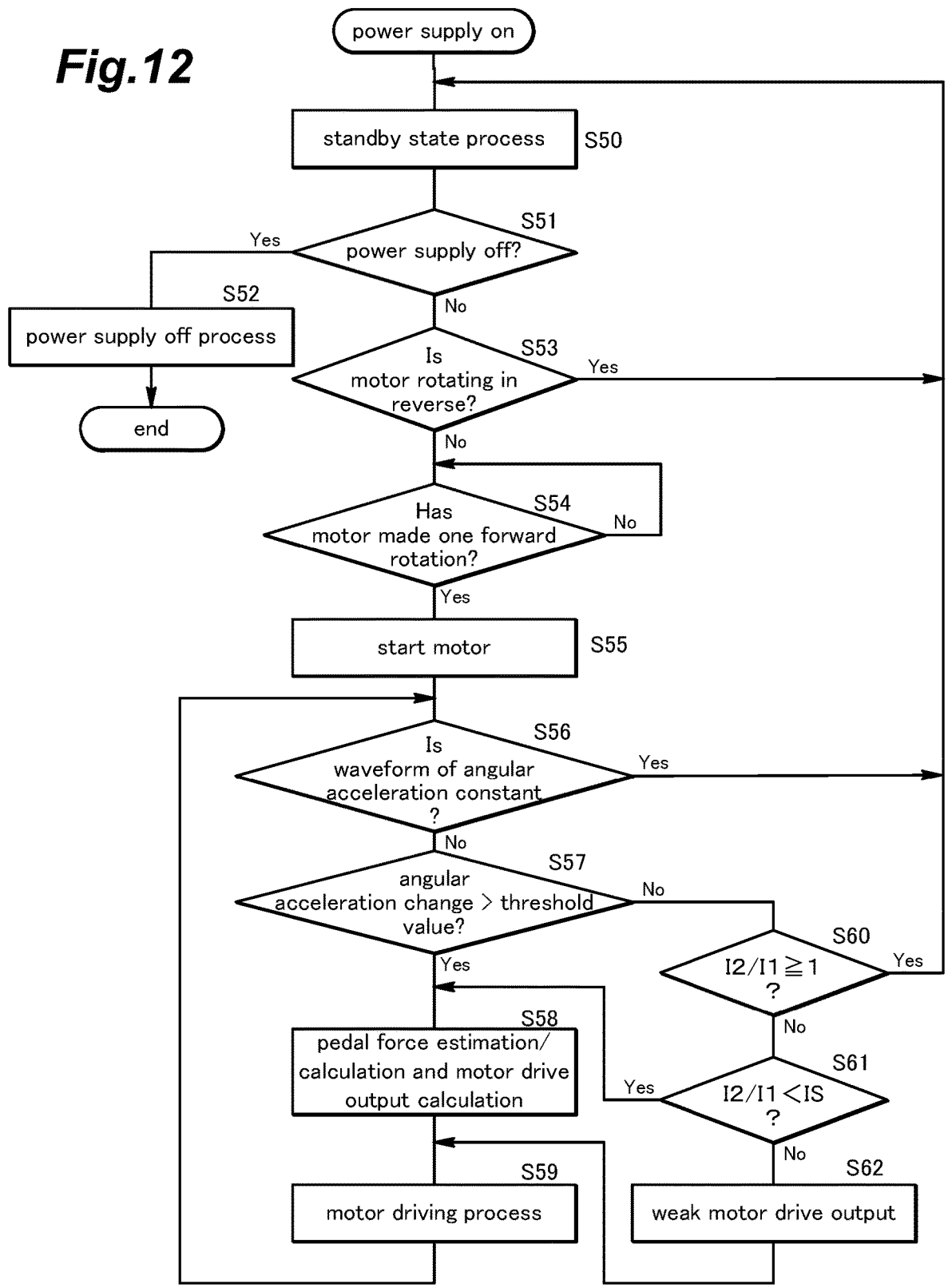
FIG. 12 is a flowchart of assist control of the bicycle electric power assist device according to another embodiment (fourth embodiment) of the present invention.

Next, a control routine of the control unit 100 according to the fourth embodiment will be described with reference to the flowchart shown in FIG. 12.

This control routine is started upon turning on of the power supply of the electric power assist unit 50, and first of all, a standby state process is performed (step S50). The standby state process includes supplying electricity to each sensor 110, 112, 141, 116, 118 to make them active and putting the electric motor 54 into a stopped state.

Then, it is determined whether the power supply of the electric power assist unit 50 has been turned off (step S51). If the power supply has been turned off, a power supply off process is performed (step S52). The power supply off process includes stopping the supply of electricity to each sensor 110, 112, 114, 116, 118.

If the power supply has not been turned off, it is determined whether the electric motor 54 is rotating in reverse (step S53). If the electric motor 54 is rotating in reverse, the flow returns to the standby state process (step S50).

If the electric motor 54 is not rotating in reverse, the electric motor 54 is started (step S55) after it is confirmed that the electric motor 54 has made one rotation (step S54).

Subsequently, it is determined whether the waveform of the angular acceleration α of the crankshaft 24 in a period of one rotation of the crankshaft 24 is constant (step S56). If the waveform of the angular acceleration α is constant, the pedal force is estimated to be substantially zero and it is determined that the bicycle is traveling under inertia and requires no assist, and the flow returns to the standby state process (step S50).

If the waveform of the angular acceleration α is not constant, it is determined whether or not a change (difference) in the angular acceleration α is greater than or equal to a prescribed threshold value (step S57). This determination is a determination as to whether or not a change (difference value) between the average value or the integrated value of the angular acceleration α in the second angle range θ2 and the average value or the integrated value of the angular acceleration α in the first angle range θ1 is greater than or equal to the prescribed threshold value.

If the change in the angular acceleration α is greater than or equal to the prescribed threshold value, calculation is performed to estimate the pedal force according to the difference value, with an assumption that the pedal force is substantially proportional to the difference value between the average value or the integrated value of the angular acceleration α in the second angle range θ2 and the average value or the integrated value of the angular acceleration α in the first angle range θ1, and a motor drive output according to the estimated pedal force is calculated (step S58).

Subsequently, a motor driving process according to the calculated motor drive output is performed (step S59). The motor driving process includes supplying a drive current according to the calculated motor drive output to the electric motor 54. Thereby, assist of the pedaling according to the pedal force is performed.

If the change in the angular acceleration α is less than the prescribed threshold value, calculation is performed to estimate the pedal force according to the difference value, with an assumption that the pedal force is substantially proportional to the difference value between the average value or the integrated value of the angular acceleration α in the first angle range θ1 and the average value or the integrated value of the angular acceleration α in the second angle range θ2, and a motor drive output according to the estimated pedal force is calculated (step S58).

Subsequently, a motor driving process according to the calculated motor drive output is performed (step S59). The motor driving process includes supplying a drive current according to the calculated motor drive output to the electric motor 54. Thereby, assist of the pedaling according to the pedal force is performed.

If the change in the angular acceleration α is less than the prescribed threshold value, the motor current I1 in the first angle range θ1 and the motor current I2 in the second angle range θ2 are calculated, and it is determined whether or not (I2/I1) is greater than or equal to 1 (step S60). If (I2/I1) is greater than or equal to 1, the flow returns to the standby state process (step S50). If (I2/I1) is less than 1, then, it is determined whether or not (I2/I1) is less than or equal to the prescribed threshold value IS (step S61).

If (I2/I1) is less than or equal to the prescribed threshold value IS, a motor drive output according to (I2/I1) is calculated (step S58) so that the motor driving process according to the calculated motor drive output is performed (step S39). Thereby, assist according to the pedaling state based on (I2/I1) is performed.

If (I2/I1) is not less than or equal to the prescribed threshold value IS, the motor drive output is set to "weak" with a predefined low output (step S52), and the motor driving process according to the "weak" motor drive output is performed (step S59).

Thus, assist according to the pedal force is performed without complicating the structure for detecting the pedal force and/or requiring modification of the bicycle 10, and assist according to the pedaling state intended by the rider is performed.

The present invention has been described in terms of preferred embodiments, but is not limited by such embodiments, and can be modified in various ways without departing from the scope of the present invention. For example, the electric motor 54 may be prevented from rotating by the outer casing 56 contacting the seat tube 12 or the chain stay 16, instead of the down tube 14 or the auxiliary tube 15. The gears of the transmission gear train 59 may be helical gears instead of spur gears. In addition, all the components shown in the above embodiment are not necessarily essential to the present invention, and can be appropriately selected, substituted and omitted without departing from the gist of the present invention.

LIST OF REFERENCE NUMERALS

| | |
|---|---|
| 10: bicycle | 12: seat tube |
| 14: down tube | 15: auxiliary tube |
| 16: chain stay | 18: frame |
| 20: tubular bearing housing | 22: pipe joint |
| 24: crankshaft | 26: crank arm |
| 28: crank arm | 30: pedal |
| 32: drive sprocket | 34: splined part |
| 36: screw hole | 38: splined hole |
| 40: screw | 49: fastening band |
| 50: electric power assist unit (bicycle electric power assist device) | |
| 51: bolt | |
| 52: housing | 52A: first half |
| 52B: second half | 52C: annular part |
| 52D: cover member | 53: first gear chamber |
| 54: electric motor | 55: bolt |
| 56: outer casing | 57: second gear chamber |
| 58: output shaft | 59: gear train |
| 60: drive spur gear | 62: bush |
| 64: intermediate shaft | 66: intermediate spur gear |
| 68: intermediate spur gear | 70: central opening |
| 72: cylindrical portion | 74: outer peripheral portion |
| 76: right side portion | 78: ball bearing |
| 80: output spur gear | 81: rotational output member |
| 82: bolt | 84: rotational output plate |
| 90: connecting member | 91: central part |
| 92: leg | 93: through hole |
| 94: screw | 96: through hole |
| 98: knock pin | 100: control unit |
| 102: battery | 110: rotation angle sensor |
| 112: pulse sensor (rotation sensor) | 114: gyro sensor |
| 116: current sensor | 118: voltage sensor |
| 120: pedal force estimation/calculation unit | |
| 122: crank forward/reverse rotation determination unit | |
| 124: pedal force presence/absence determination unit | |
| 126: motor drive control unit | 128: motor drive circuit |

The invention claimed is:

1. A bicycle electric power assist device, comprising:
an electric motor connected in a torque transmitting relationship to crank arms or a crankshaft driven by a pedal force from pedals via the crank arms;
a battery to be mounted on a bicycle to serve as a power supply for the electric motor;
a control unit configured to control operation of the electric motor;
a rotation angle sensor configured to detect a crank rotation angle position of the crankshaft; and
a current sensor configured to detect a motor current of the electric motor,
wherein the control unit comprises:
a pedal force estimation/calculation unit configured to estimate the pedal force from a difference between the motor current in a first crank rotation angle position and the motor current in a second crank rotation angle position which is different from the first crank rotation angle position; and
a motor drive control unit configured to control driving of the electric motor according to the pedal force estimated by the pedal force estimation/calculation unit.

2. The bicycle electric power assist device according to claim 1, wherein the motor drive control unit is further configured to calculate an angular velocity of the crankshaft from the crank rotation angle position and to control the driving of the electric motor according to a difference between the angular velocity in the first crank rotation angle position and the angular velocity in the second crank rotation angle position.

3. The bicycle electric power assist device according to claim 1, wherein the motor drive control unit is further configured to calculate an angular acceleration of the crankshaft from the crank rotation angle position and to control the driving of the electric motor according to a difference between the angular acceleration in the first crank rotation angle position and the angular acceleration in the second crank rotation angle position.

4. The bicycle electric power assist device according to claim 1, wherein the first crank rotation angle position is within an angle range less than or equal to 90 degrees from a highest position of one of the pedals, the second crank rotation angle position is within an angle range greater than or equal to 90 degrees and less than or equal to 180 degrees from the highest position of the one of the pedals.

5. The bicycle electric power assist device according to claim 1, comprising a crank forward/reverse rotation determination unit configured to determine forward rotation and reverse rotation of the crankshaft from the crank rotation angle position detected by the rotation angle sensor,
wherein the motor drive control unit is performs control to stop the driving of the electric motor when the crank forward/reverse rotation determination unit determines that the crankshaft is rotating in reverse.

6. The bicycle electric power assist device according to claim 1, comprising:
a rotation sensor configured to detect rotation of the crankshaft; and
a pedal force presence/absence determination unit configured to determine presence or absence of the pedal force applied to the pedals from the rotation of the crankshaft detected by the rotation sensor,
wherein the motor drive control unit performs control to stop the driving of the electric motor when the pedal force presence/absence determination unit determines that there is no pedal force.

7. The bicycle electric power assist device according to claim 1, comprising a gyro sensor configured to detect a tilt of the bicycle,
wherein the motor drive control unit is further configured to perform control to reduce a rotation output of the electric motor according to the tilt of the bicycle detected by the gyro sensor.

8. The bicycle electric power assist device according to claim 1, comprising a voltage sensor configured to detect a voltage of the battery,
wherein the motor drive control unit is further configured to perform control to reduce a rotation output of the electric motor according to a drop in the voltage detected by the voltage sensor.

9. A bicycle having the bicycle electric power assist device according to claim 1 mounted thereon.

10. A bicycle electric power assist device, comprising:
an electric motor connected in a torque transmitting relationship to crank arms or a crankshaft driven by a pedal force from pedals via the crank arms;
a battery to be mounted on a bicycle to serve as a power supply for the electric motor;

a control unit configured to control operation of the electric motor; and a rotation angle sensor configured to detect a crank rotation angle position of the crankshaft, wherein the control unit comprises:

a pedal force estimation/calculation unit configured to calculate an angular velocity of the crankshaft from a change in the crank rotation angle position and to estimate the pedal force from a difference between the angular velocity in a first crank rotation angle position and the angular velocity in a second crank rotation angle position which is different from the first crank rotation angle position; and a motor drive control unit configured to control driving of the electric motor according to the pedal force estimated by the pedal force estimation/calculation unit.

11. The bicycle electric power assist device according to claim 10, comprising a current sensor configured to detect a motor current of the electric motor, wherein the motor drive control unit is further configured to control operation of the electric motor according to a difference between the motor current in the first crank rotation angle position and the motor current in the second crank rotation angle position.

12. The bicycle electric power assist device according to claim 10, wherein the first crank rotation angle position is within an angle range less than or equal to 90 degrees from a highest position of one of the pedals, the second crank rotation angle position is within an angle range greater than or equal to 90 degrees and less than or equal to 180 degrees from the highest position of the one of the pedals.

13. The bicycle electric power assist device according to claim 10, comprising a crank forward/reverse rotation determination unit configured to determine forward rotation and reverse rotation of the crankshaft from the crank rotation angle position detected by the rotation angle sensor, wherein the motor drive control unit is performs control to stop the driving of the electric motor when the crank forward/reverse rotation determination unit determines that the crankshaft is rotating in reverse.

14. The bicycle electric power assist device according to claim 10, comprising:

a rotation sensor configured to detect rotation of the crankshaft; and a pedal force presence/absence determination unit configured to determine presence or absence of the pedal force applied to the pedals from the rotation of the crankshaft detected by the rotation sensor, wherein the motor drive control unit performs control to stop the driving of the electric motor when the pedal force presence/absence determination unit determines that there is no pedal force.

15. The bicycle electric power assist device according to claim 10, comprising a gyro sensor configured to detect a tilt of the bicycle, wherein the motor drive control unit is further configured to perform control to reduce a rotation output of the electric motor according to the tilt of the bicycle detected by the gyro sensor.

16. A bicycle electric power assist device, comprising:

an electric motor connected in a torque transmitting relationship to crank arms or a crankshaft driven by a pedal force from pedals via the crank arms;

a battery to be mounted on a bicycle to serve as a power supply for the electric motor;

a control unit configured to control operation of the electric motor; and a rotation angle sensor configured to detect a crank rotation angle position of the crankshaft, wherein the control unit comprises:

a pedal force estimation/calculation unit configured to calculate an angular acceleration of the crankshaft from a change in the crank rotation angle position and to estimate the pedal force from a difference between the angular acceleration in a first crank rotation angle position and the angular acceleration in a second crank rotation angle position which is different from the first crank rotation angle position; and a motor drive control unit configured to control driving of the electric motor according to the pedal force estimated by the pedal force estimation/calculation unit.

17. The bicycle electric power assist device according to claim 16, comprising a current sensor configured to detect a motor current of the electric motor, wherein the motor drive control unit is further configured to control operation of the electric motor according to a difference between the motor current in the first crank rotation angle position and the motor current in the second crank rotation angle position.

18. The bicycle electric power assist device according to claim 16, wherein the first crank rotation angle position is within an angle range less than or equal to 90 degrees from a highest position of one of the pedals, the second crank rotation angle position is within an angle range greater than or equal to 90 degrees and less than or equal to 180 degrees from the highest position of the one of the pedals.

19. The bicycle electric power assist device according to claim 16, comprising a crank forward/reverse rotation determination unit configured to determine forward rotation and reverse rotation of the crankshaft from the crank rotation angle position detected by the rotation angle sensor, wherein the motor drive control unit is performs control to stop the driving of the electric motor when the crank forward/reverse rotation determination unit determines that the crankshaft is rotating in reverse.

20. The bicycle electric power assist device according to claim 16, comprising:

a rotation sensor configured to detect rotation of the crankshaft; and a pedal force presence/absence determination unit configured to determine presence or absence of the pedal force applied to the pedals from the rotation of the crankshaft detected by the rotation sensor, wherein the motor drive control unit performs control to stop the driving of the electric motor when the pedal force presence/absence determination unit determines that there is no pedal force.

* * * * *